(12) United States Patent
Hutter, III

(10) Patent No.: US 6,773,780 B2
(45) Date of Patent: Aug. 10, 2004

(54) SELF FIXTURING ADHESIVE ATTACHMENT

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 0 days.

(21) Appl. No.: 10/219,707

(22) Filed: Aug. 14, 2002

(65) Prior Publication Data

US 2003/0035684 A1 Feb. 20, 2003

Related U.S. Application Data

(60) Provisional application No. 60/312,691, filed on Aug. 14, 2001.

(51) Int. Cl.[7] .............................................. B32B 31/20
(52) U.S. Cl. ...................... 428/40.1; 403/267; 403/268; 428/41.9; 428/42.2; 428/42.3; 428/119; 428/120; 428/200; 428/202
(58) Field of Search ................................ 428/40.1, 41.9, 428/42.2, 42.3, 119, 120, 200, 202; 403/267, 268

(56) References Cited

U.S. PATENT DOCUMENTS

| | | |
|---|---|---|
| 4,302,492 A | 11/1981 | Hutter, III |
| 4,338,151 A | 7/1982 | Hutter, III |
| 4,390,576 A | 6/1983 | Hutter, III |
| 4,668,546 A | 5/1987 | Hutter, III |
| 4,778,702 A | 10/1988 | Hutter, III |
| 4,822,656 A | 4/1989 | Hutter, III |
| 5,013,391 A | 5/1991 | Hutter, III et al. |
| 5,704,747 A | 1/1998 | Hutter, III et al. |

*Primary Examiner*—Nasser Ahmad
(74) *Attorney, Agent, or Firm*—Kelly Lowry & Kelley, LLP

(57) ABSTRACT

A self fixturing adhesive attachment is provided for securely mounting an attachment component such as a threaded stud on the surface of a substrate. The self fixturing attachment includes a base fixture carrying the attachment component and defining a base surface for receiving a selected curable bonding agent thereon. A resilient pressure sensitive adhesive member has a first portion carried by the attachment component at a blind side thereof, a second portion secured to the base fixture, and a third portion extending therebetween. Following pressed mounting of the base fixture with bonding agent thereon onto the substrate, the attachment component is movable to press the first portion of the pressure sensitive adhesive member into adherence with the substrate, resulting in stretched elongation of the third portion thereof to pull the base fixture with a positive force toward the substrate for the duration of the bonding agent cure time.

38 Claims, 16 Drawing Sheets

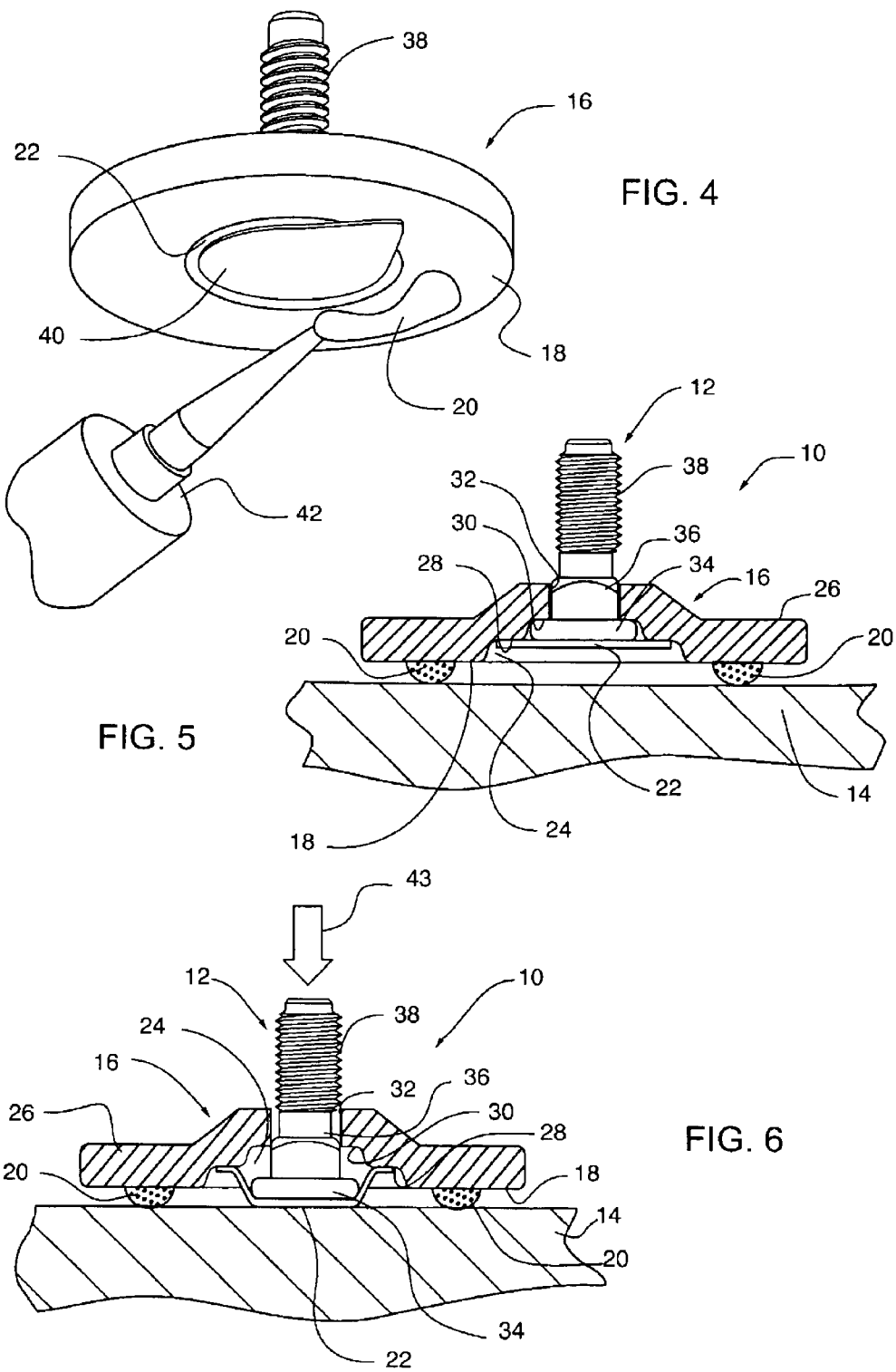

SELF FIXTURING ADHESIVE ATTACHMENT

This application claims the benefit of U.S. Provisional Application No. 60/312,691, filed Aug. 14, 2001.

BACKGROUND OF THE INVENTION

This invention relates generally to adhesive attachment assemblies or fixtures and related methods for securing an adhesive attachment or the like to a supporting surface or substrate. More specifically, this invention relates to improvements in such adhesive attachment assemblies or fixtures, of the general type shown and described in U.S. Pat. Nos. 4,302,492; 4,338,151; 4,390,546; 4,668,546; 4,778,702; and 4,822,656, and particularly with respect to providing a simplified attachment configuration wherein post-installation removal of a separate mounting or support fixture is not required.

In many instances, it is necessary or desirable to attach an attachment component or element such as a patch, threaded screw, or other structure onto a supporting substrate. For example, it may necessary to apply a thin patch to the skin of an aircraft or to the hull of a boat to repair a hole therein. Alternately, it may be desirable to mount a threaded stud or other device onto a substrate, for example, the windshield of an automobile, without requiring a hole to be made in the substrate. In many such cases, it is necessary for the attachment component to be located on the substrate with relatively high precision and further that a positive force be applied urging the attachment component against the substrate for at least some minimum time period to allow, for example, curing of an adhesive bonding agent such as a curable epoxy or the like to achieve a substantially optimized and secure bond with the substrate.

In the past, many different clamp and fixture devices have been proposed for use in temporarily holding an attachment component on the surface of a substrate during the cure time of a bonding agent. The majority of such clamp and fixture devices have required some form of mechanical connection to the substrate by means of screws or other mechanical fasteners, clamping jaws, etc. However, these devices are not suited for use with extended surface areas or for use with fragile or thin-walled substrates within which surface interruptions to accommodate mechanical fastening are not possible or desirable. Other fixturing devices have been proposed which rely upon suction cups for holding an attachment component in position on a substrate, but suction cup devices are limited to use with relatively smooth-surfaced substrates and further function to retain the attachment component in place without exerting significant positive forces urging the attachment component against the substrate. As a result, with suction cup devices, the bonding agent on the substrate can be unevenly distributed and/or cure with less than optimum bond strength.

Improved adhesive attachment devices are described and claimed in U.S. Pat. Nos. 4,302,492; 4,338,151; 4,390,546; 4,668,546; 4,778,702; and 4,822,656. More particularly, these devices disclose attachment devices having a support fixture for temporary securement to the substrate by means of a pressure sensitive adhesive or the like, in combination with force bias or spring means for applying a force urging the attachment component into positive bearing engagement with the substrate for the cure time duration of a selected adhesive bonding agent. The support fixture or a portion thereof is movable between a first position with the adhesive component substantially out of bearing engagement with the substrate to a second position with the attachment component pressed firmly against the substrate. An over-center mechanism constitutes the movable element in most of the described embodiments. Following curing of the adhesive bonding agent, the support fixture is removed from the substrate to leave the attachment component such as a threaded bolt or the like securely bonded to the substrate. In this regard, the pressure sensitive adhesive has a sufficient adhesion strength for retaining the attachment component in position during curing of the bonding agent, but insufficient adhesion strength to preclude subsequent tear-off removal of the support fixture from the substrate.

While the improved attachment devices described in the above referenced patents offer significant advantages in comparison with the previous art, they have each required the support fixture which must be removed and is typically discarded after the selected adhesive bonding agent has cured.

The present invention relates to an improved and relatively simplified adhesive attachment wherein removal of a support fixture component from the substrate following curing of the adhesive bonding agent is not required.

SUMMARY OF THE INVENTION

In accordance with the invention, a self fixturing adhesive attachment is provided for securely mounting an attachment component such as a threaded stud or the like relative to the surface of a substrate. The self fixturing attachment comprises, in one preferred form, a base fixture carrying the attachment component and defining a base surface for receiving a selected bonding agent thereon. A resilient pressure sensitive adhesive member has a first portion carried by the attachment component at a blind side thereof, a second portion secured to the base fixture, and a third portion extending therebetween. Upon pressed mounting of the base fixture with the bonding agent thereon onto the surface of the substrate, the attachment component is movable to press the first portion of the pressure sensitive adhesive member into adherence with the substrate, resulting in stretched elongation of the third portion thereof to pull the base fixture with a positive force toward the substrate for the duration of the bonding agent cure time.

In a preferred form, the base fixture comprises a disk which is centrally dished to define a shallow cavity at a blind side thereof, and wherein this shallow cavity is circumscribed by a generally annular attachment or base surface. The attachment component comprises a threaded bolt or the like having an enlarged head seated within said disk cavity in a position generally circumscribed by the annular base surface, and a threaded shank protruding through a central disk port to a front side of the base fixture. A bolt shoulder of noncircular or square cross section or the like is positioned within the disk port which has a mating noncircular or square cross sectional shape or the like to prevent relative rotation between the attachment component and the base fixture. The pressure sensitive adhesive member comprises, in the preferred form, a layer of a pressure sensitive elastomer such as that marketed by 3M Company of Minneapolis, Minn. under the designation VHB Type 4910 Tape, having elastomeric bulk properties permitting about 100% elongation without tearing and high strength acrylic pressure sensitive adhesive on opposed surfaces. This adhesive layer includes the first portion comprising a central region adhered to a blind side of the bolt head, the second portion comprising a peripheral margin adhered to the base fixture at an annular recessed shoulder formed within the disk cavity, and an annular third portion extending therebetween.

The selected adhesive bonding agent is applied to the annular attachment or base surface at the blind or underside of the base fixture, and the base fixture is then press-mounted onto the substrate at a selected location. In this initial mounted position, the pressure sensitive adhesive layer is supported in an unstressed state by the base fixture and the attachment component, with the adhesive layer retracted or spaced at least slightly from the adjacent surface of the substrate. The attachment component is then movable relative to the base fixture to press the first portion or central region of the adhesive layer into firm pressure sensitive adherence with the substrate. This displaces the first portion of the adhesive layer out of alignment with the second portion or peripheral margin thereof, resulting in stretched elongation of the intermediate third layer portion to apply the desired force pulling the base fixture positively against the substrate for the duration of the bonding agent cure time. Thereafter, the base fixture supports and anchors the attachment component securely on the substrate for normal use.

In one alternative preferred form, the pressure sensitive adhesive member may be substituted by temporary attachment means such as a pointed nail for securing the attachment component to the substrate, in combination with spring means acting between the attachment component and the base fixture for applying a positive force urging the base fixture against the substrate for the duration of the bonding agent cure time. In this embodiment, following pressed mounting of the base fixture with bonding agent thereon onto the substrate, the attachment component such as a threaded bolt can be impact driven against the substrate for connecting the bolt head to the substrate. In one form, the temporary attachment means comprises a concrete nail carried on the bolt head for penetrating a concrete substrate. The spring means comprises a leaf spring or the like reacting between the threaded bolt and the base fixture, for positively urging the base fixture toward the substrate following connection of the bolt head to the substrate.

In a further alternative preferred form of the invention, the base fixture may comprise the functional element of the self fixturing adhesive attachment, wherein the attachment component supported thereby provides means for urging the base fixture against the substrate with a positive force for the cure time of a selected bonding agent. In this embodiment, the attachment component comprises a button carried by the base fixture for movement between a normal position retracted slightly from the substrate, upon initial pressed mounting of the base fixture with bonding agent thereon against the substrate, and an advanced position pressed firmly against the substrate. In the advanced position, the button presses a first portion of a resilient pressure sensitive adhesive member against the substrate in the manner previously described, resulting in stretched elongation of a third portion thereof to pull the base fixture against the substrate with a positive force. Alternately, or in addition, a temporary attachment means such as a pointed nail in combination with spring means may be provided in the manner previously described for positively urging the base fixture against the substrate. In one preferred form, the base fixture may comprise an electrical junction box or the like, with multiple buttons carried thereby for pulling the junction box against the substrate with a positive force for the cure time of the bonding agent.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is a bottom perspective view of the adhesive attachment of FIG. 1, depicting application of a selected adhesive bonding agent to a base fixture;

FIG. 5 is a fragmented sectional view similar to FIG. 2, and illustrating initial placement of the base fixture onto the surface of the substrate;

FIG. 6 is a fragmented sectional view similar to FIG. 5, and showing displacement of an attachment component into temporary adhesive engagement with the substrate for applying a positive force urging the base fixture against the substrate for the duration of a bonding agent cure time;

DETAILED DESCRIPTION OF THE PREFERRED EMBODIMENTS

Figure 1:
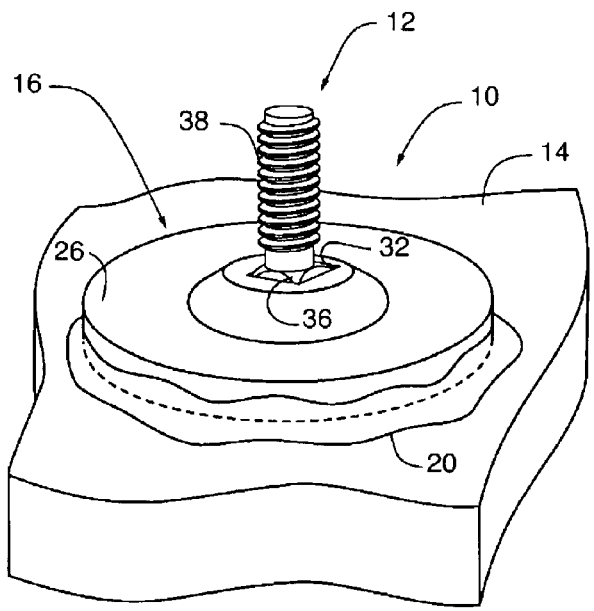
FIG. 1 is a fragmented top perspective view illustrating a self fixturing adhesive attachment in one preferred form, embodying the novel features of the invention and shown mounted onto a substrate surface.

As shown in the exemplary drawings, a self fixturing adhesive attachment referred to generally by the reference numeral 10 in FIG. 1 is provided for quick, easy and secure adhesive mounting of an attachment component 12 such as a threaded bolt or the like onto the surface of a substrate 14. The self fixturing attachment 10 includes a base fixture 16 defining a blind side base surface 18 (FIGS. 2 and 4–7) for secure bonded fixation to the substrate 14 by means of a selected curable bonding agent 20 (FIGS. 4–7). An adhesive member 22 such as a layer of a selected pressure sensitive adhesive material is carried jointly by the attachment component 12 and the base fixture 16, and is adapted to be stretched therebetween to apply a positive force urging the base fixture 16 toward the substrate 14 for the duration of a cure cycle for the bonding agent 20.

Figure 2:
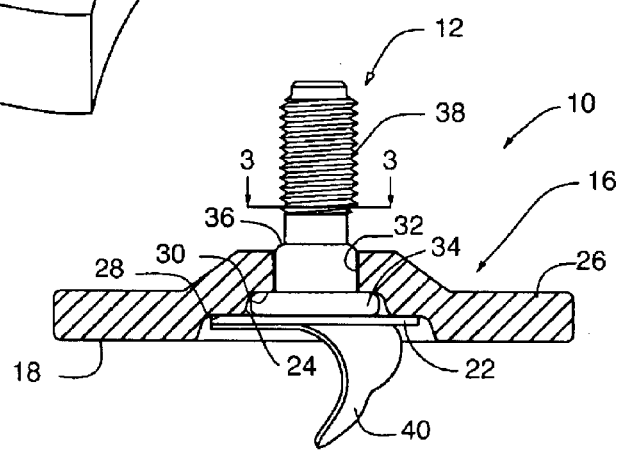
FIG. 2 is an enlarged transverse sectional view of the self fixturing adhesive attachment of FIG. 1.
Figure 3:
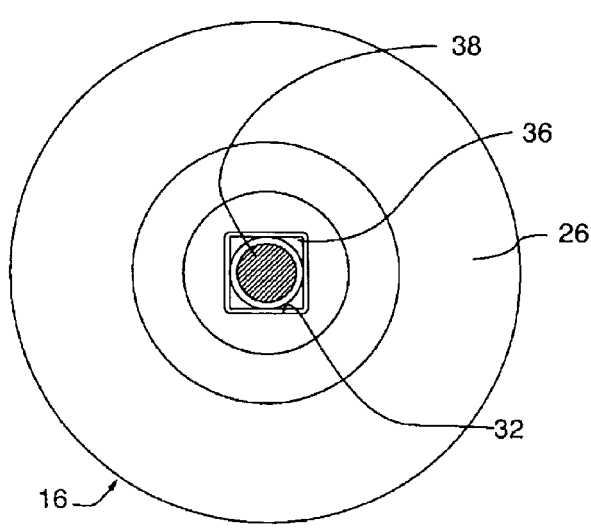
FIG. 3 is a fragmented sectional view taken generally on the line 3—3 of FIG. 2.
Figure 7:
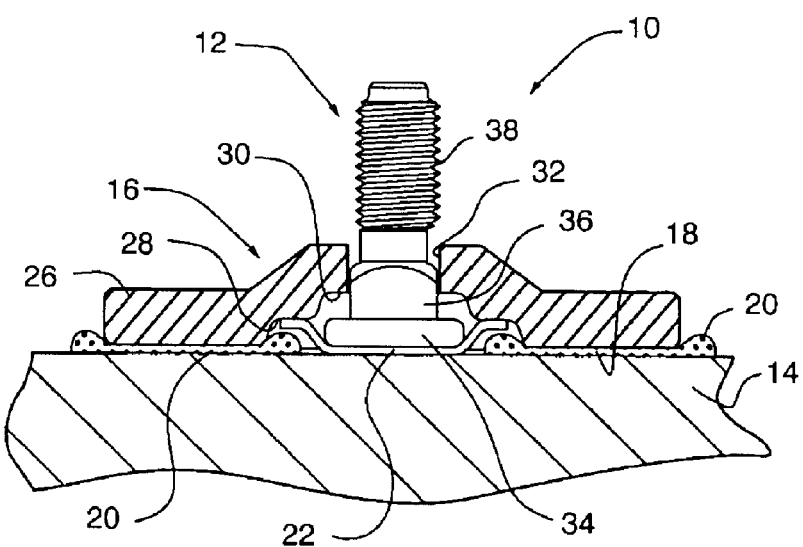
FIG. 7 is a fragmented sectional view similar to FIG. 6, and depicting the adhesive attachment in a position bonded to the substrate.
Figure 8:
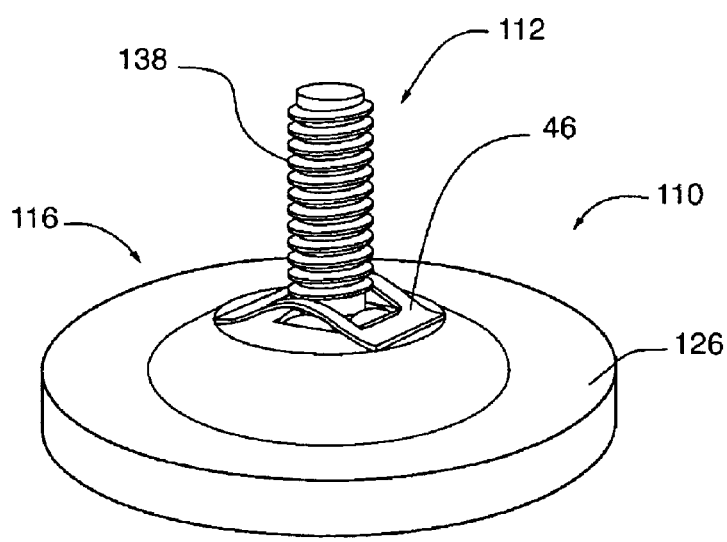
FIG. 8 is a fragmented top perspective view of a self fixturing adhesive attachment in accordance with one alternative preferred form of the invention.

The illustrative base fixture 16 (FIGS. 1–7) generally comprises a disk shaped structure which can be formed from a metal, plastic, or composite material selected for optimum bond strength attachment to the material of the substrate 14. FIGS. 1 and 2 depict the base fixture 16 to have a centrally dished construction defining a shallow cavity 24 formed at a rear or blind side thereof (FIG. 2), wherein this cavity 24 is surrounded or circumscribed by a relatively flat annular base 26 having a blind side defining the base surface 18 of annular shape. The cavity 24 is shown to have a stepped cross sectional configuration including a successive pair of generally annular, rearwardly presented shoulders 28 and 30. A central port 32 is formed in the disk in a position generally coaxial with the shoulders 28, 30, and in the preferred form has a noncircular port shape such as the square shape shown best in FIGS. 1 and 3.

The attachment component 12 is shown in the illustrative embodiment of the invention (FIGS. 1–7) in the form of a threaded bolt, although persons skilled in the art will recognize and appreciate that alternative attachment components such as a patch, cable tie or the like may be used. As shown, the bolt comprises a bolt head 34 having a size and shape for nested reception into the blind side cavity 24 of the base fixture 16, in a position seated against the radially smaller or inner shoulder 30 formed therein. A bolt shoulder 36 projects from the bolt head 34 into and through the central port 32 formed in the base fixture 16, wherein this bolt shoulder 36 has a noncircular shape such as the illustrative square cross sectional shape (FIGS. 1 and 3) to fit matingly through said disk port 32 whereby relative rotation between the bolt and support fixture are substantially prevented. This bolt shoulder 36 is joined in turn with a threaded shank 38 which projects forwardly from and is thus exposed at a front side of the base fixture 16.

The adhesive member 22 (FIG. 2) generally comprises a relatively thick layer of a resilient material connected as by pressure sensitive adhesion to the rear or blind side of the bolt head 34, and also to the base fixture 16 as by pressure sensitive adhesion to the radially larger or outer shoulder 28 formed therein. In this configuration, the adhesive layer 22 has a generally circular disk shape with a first portion or central segment overlying and adhered to the blind side of the attachment component such as the bolt head 34 as shown, a second or peripheral margin overlying and adhered to the shoulder 28 within the base fixture cavity 24, and a generally annular third portion extending therebetween. As shown in FIG. 2, in a normal unstressed configuration prior to use, the adhesive layer 22 supports the attachment component 12 in a manner to position a rear or blind side of the adhesive layer 22 retracted or inset at least slightly from the plane of the base fixture surface 18. A peel-off protective strip 40 of paper or the like is desirably provided to cover the blind side of the adhesive layer 22 prior to use.

In the preferred form, this adhesive layer 22 comprises a selected pressure sensitive adhesive material such as that marketed by 3M Company of Minneapolis, Minn. under the designation VHB Type 4910 Tape, having elastomeric bulk properties allowing 100% elongation without tearing and a coating of high strength acrylic pressure sensitive adhesive on opposed surfaces of the approximately 0.040 inch thick tape. In an alternative form, in this and other embodiments of the invention to be described herein, this pressure sensitive adhesive layer may comprise a resilient foam material having a pressure sensitive adhesive coating on both sides thereof for adhesion to the attachment component 12 and the base fixture shoulder 28, and also to the substrate as will be described in more detail.

In use, the selected bonding agent 20 such as a curable epoxy resin or the like is applied to the annular base surface 18 of the base fixture 16, as by means of an appropriate applicator 42 as viewed in FIG. 4. The bonding agent 20 is preferably spread over the contact area of the base surface 18 in a relatively uniform layer thickness, although close attention to layer thickness uniformity is not required. Alternately, or in addition, the bonding agent 20 may be applied directly to a designated surface area on the substrate. The peel-off strip 40 (FIGS. 2 and 4) is then removed from the rear or blind side of the adhesive layer 22. The adhesive attachment 10 is then pressed onto the surface of the substrate 14 at the selected mounting site, to press the bonding agent 20 interposed between the base surface 18 and the substrate 14 into intimate surface contact with both surfaces. In this initial mounted position, as viewed in FIG. 5, the attachment component is in a first or retracted position relative to the base fixture, with the adhesive layer 22 within the base fixture cavity 24 preferably having the rear or blind side thereof disposed in at least slightly spaced relation to the substrate 14.

As shown in FIG. 6, the attachment component 12 is then pressed in the direction of arrow 43 to advance or push the bolt head 34 toward a second or advanced position, in a direction toward the substrate 14. This action displaces the attachment component 12 through a short axial stroke relative to the base fixture 16, but without displacing the bolt shoulder 36 beyond the central port 32 in the base fixture 16, for purposes of pressing the first portion or central segment of the adhesive layer 22 firmly into pressure sensitive adherence with the substrate 14. Importantly, the second portion or peripheral margin of the adhesive layer 22 remains adhered to the base fixture shoulder 28, such that the intermediate third portion is stretched or elongated as viewed in FIG. 6. Such stretched elongation places the intermediate third portion of the adhesive layer under tension to apply a pulling force which positively draws or urges the base fixture 16 in a direction toward the substrate 14. The magnitude of this pulling force is on the order of about 1 pound, and is less than the adhesion force of the adhesive layer 22 with the substrate 14, or with the base fixture shoulder 28.

This positive pulling force applied to the base fixture 16 by the adhesive layer 22 functions to retain the entire adhesive attachment 10 in the precise desired location on the substrate during curing of the bonding agent 20, particularly in the case wherein the substrate comprises a vertically oriented wall surface or the like. In addition, this positive force causes the bonding agent 20 to extrude between the fixture base surface 18 and the substrate 14 into a relatively thin bond layer of precision uniform thickness (FIG. 7) in intimate contact therewith to achieve a substantially optimized bond strength between the substrate 14 and the base fixture 16. After the bonding agent 20 has cured, the attachment component 12 can be used in a normal manner, as by affixation of a threaded nut (not shown) to the threaded shank 38 of the bolt. In this regard, the base fixture 16 is not removed from the substrate 14 following curing of the bonding agent, but instead remains securely fastened to the substrate for purposes of supporting and retaining the attachment component such as the illustrative bolt in place. Subsequent forces applied to the attachment component during normal use may be sufficient to separate the adhesive layer 22 from the substrate 14, but such normal usage forces are inadequate to separate the base fixture from the substrate. Moreover, such subsequent separation of the bolt head 34 from the substrate 14 can be beneficial in facilitating mounting of a nut or the like to the bolt shank 38. Despite such separation, however, the base fixture 16 retains the attachment component 12 in a position securely mounted on the substrate 14.

One alternative preferred form of the invention is shown in FIGS. 8–13, wherein components corresponding in structure and function to those shown and described with respect to FIGS. 1–7 are identified by common reference numerals increased by 100. In this version of the invention, a modified self fixturing adhesive attachment 110 includes an attachment component 112 such as a threaded bolt or the like carried by a base fixture 116 for secure mounting onto a substrate 114. The adhesive attachment 110 includes alternative means for temporarily securing the attachment component 112 to the substrate 114, in combination with spring means for positively urging the base fixture 116 against the substrate for the duration of the cure time of a selected adhesive bonding agent 120.

More particularly, the modified adhesive attachment 110 comprises the base fixture 116 in the form of a centrally dished disk having a generally flat annular base 126 defining an annular base surface 118 at a blind side thereof circumscribing a blind side cavity 124. The attachment component 112 comprises a threaded bolt having an enlarged head 134 seated within the cavity 124, a bolt shoulder 136 of noncircular shape fitted into a matingly shaped central port 132 formed in the base fixture, and a threaded shank 138 exposed at a front side of the base fixture. Importantly, the bolt head 134 carries a downwardly projecting temporary fastener element such as a concrete nail 44. In addition, a spring element 46 in the form of a leaf spring or the like is carried by the threaded shank 138 and has outboard ends for springably engaging the top or front side of the base fixture 116, as will be described.

Figure 9:
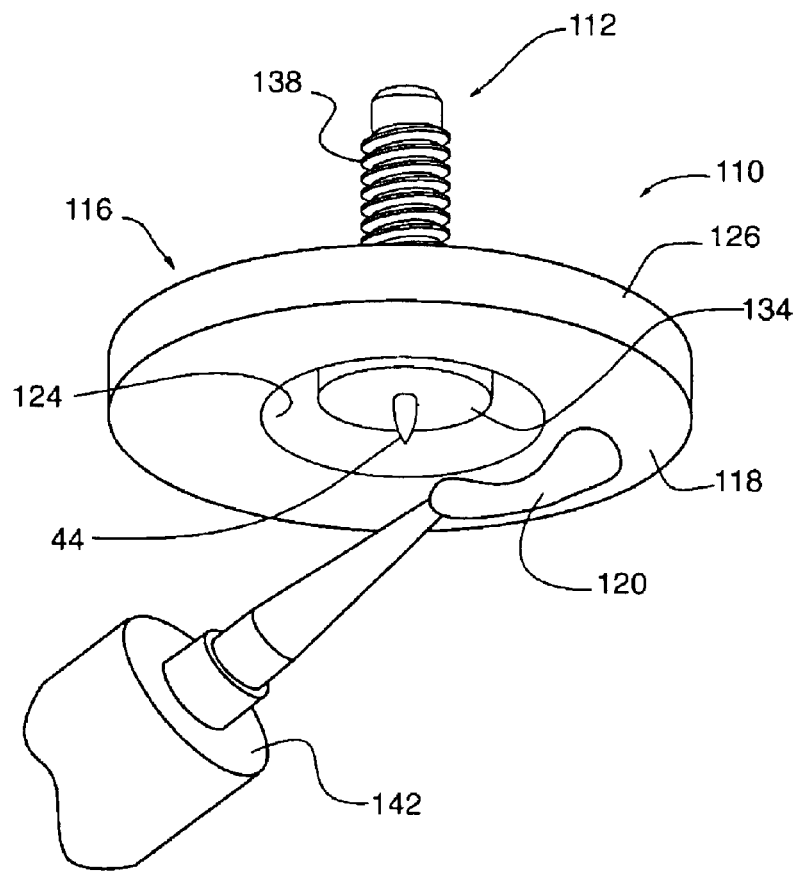
FIG. 9 is a bottom perspective view of the adhesive attachment of FIG. 8, illustrating application of a selected adhesive bonding agent to a base fixture thereof.
Figure 10:
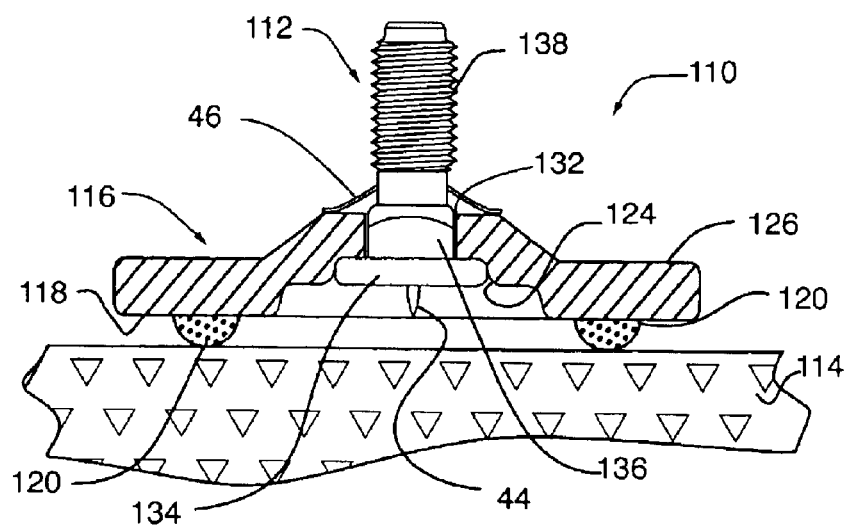
FIG. 10 is a fragmented transverse sectional view of the adhesive attachment of FIG. 8, illustrating initial placement of the base fixture onto the surface of a substrate.
Figure 11:
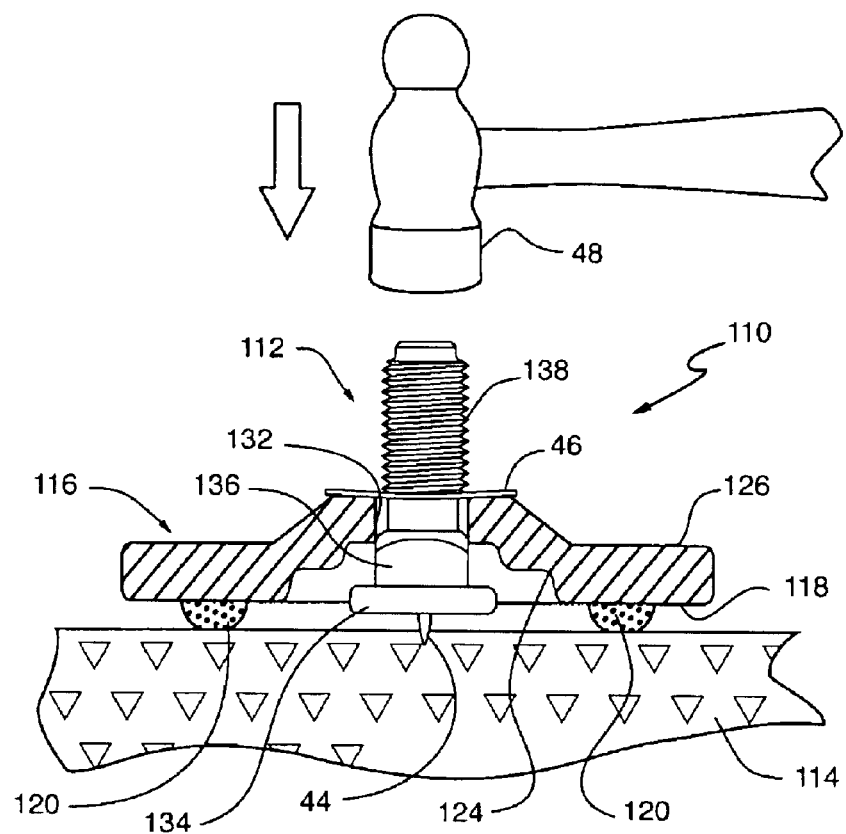
FIG. 11 is a fragmented sectional view similar to FIG. 10, and showing displacement of an attachment component into temporary securement with the substrate for applying a positive force urging the base fixture against the substrate for the bonding agent cure time.
Figure 12:
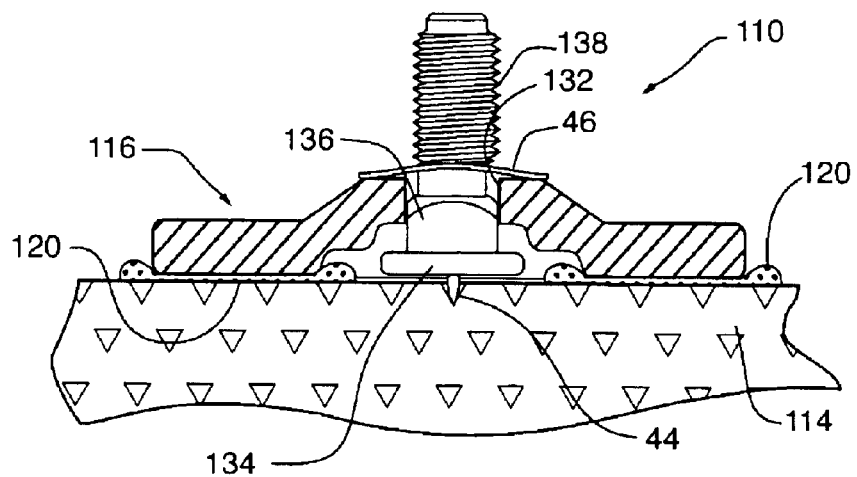
FIG. 12 is a fragmented sectional view similar to FIG. 11, and depicting the adhesive attachment in a position bonded to the substrate.
Figure 13:
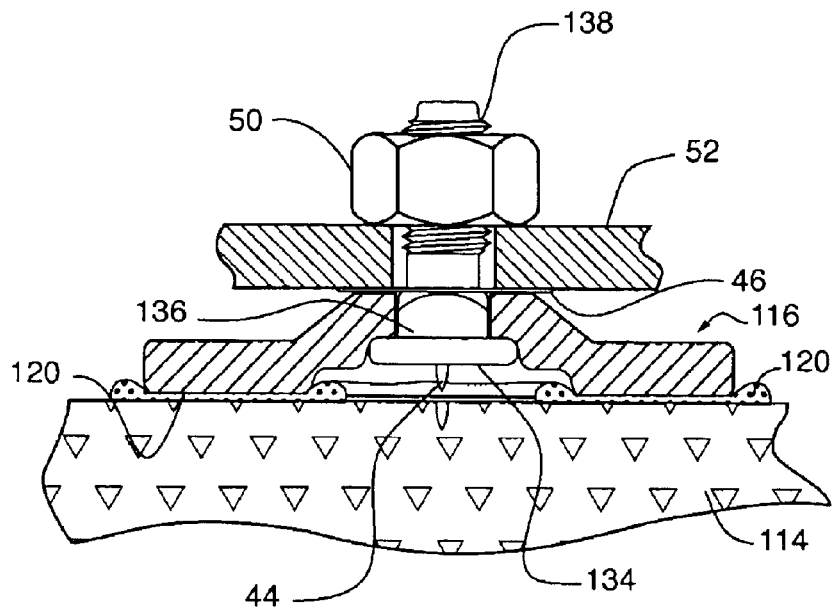
FIG. 13 is a fragmented sectional view similar to FIG. 12, and illustrating connection of auxiliary items to the attachment component.

In use, as viewed in FIG. 9, the blind side base surface 118 of the base fixture 116 is coated with a selected adhesive bonding agent 120 such as a selected curable epoxy applied from a suitable applicator 142. The base fixture 116 is then pressed onto the substrate 114 at a selected mounting location. In this initial press-on position, as viewed in FIG. 10, the temporary fastener element 44 is spaced at least slightly from the substrate surface. Then, a suitable impact tool 48 such as a hammer or the like is utilized to strike the end of the bolt (FIG. 11) to displace the attachment component 112 in a manner to drive the fastener element 44 into at least temporary connection with the substrate 114. In this regard, in a preferred form of the invention, the temporary fastener element 44 comprises a concrete nail for penetrating a concrete substrate, although alternative temporary fastener means such as a bead of a cyanoacrylate adhesive adapted to rupture upon impact contact with the substrate may be used. Such displacement of the attachment component 112 relative to the base fixture 116 partially collapses the spring element 46 which reacts between the bolt threads and the base fixture 116 to press the base fixture 116 against the substrate 114 with a positive force. As a result, the adhesive bonding agent 120 extrudes between the fixture base surface 118 and the substrate 114 into a relatively thin bond layer of precision uniform thickness (FIG. 12) to achieve a substantially optimized bond strength between the substrate 114 and the base fixture 116. After the bonding agent 120 has cured, the attachment component 112 can be used in a normal manner, as by affixation of a threaded nut 50 (FIG. 13) to the threaded shank 138 of the bolt for mounting a selected frame member 52 or other structure thereto. In this regard, the base fixture 116 again is not removed from the substrate 114 following curing of the bonding agent, but instead remains securely fastened to the substrate for purposes of supporting and retaining the attachment component in place. Subsequent forces applied to the attachment component during normal use may be sufficient to separate the bolt head 134 from the substrate 114, but such normal usage forces are inadequate to separate the base fixture from the substrate.

Figure 14:
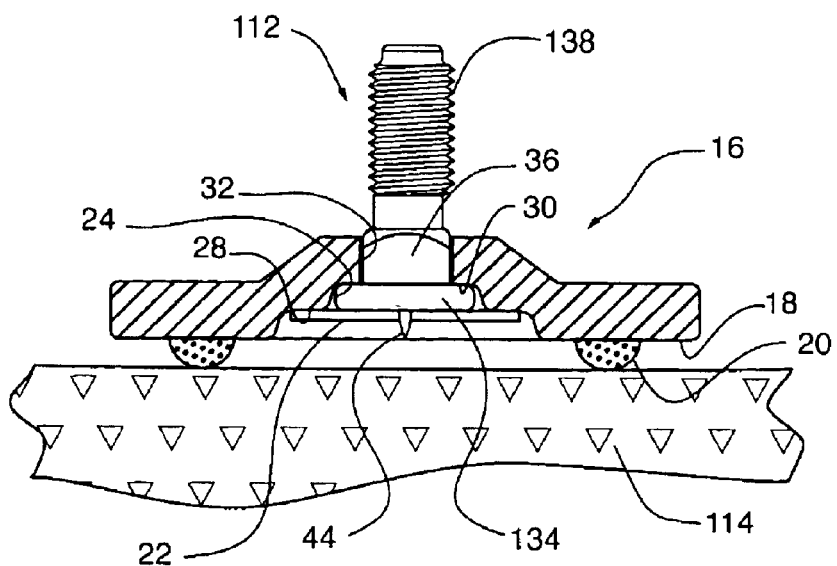
FIG. 14 is a fragmented transverse sectional view similar to FIG. 10, but showing a further alternative preferred embodiment of self fixturing adhesive attachment in accordance with the invention.
Figure 15:
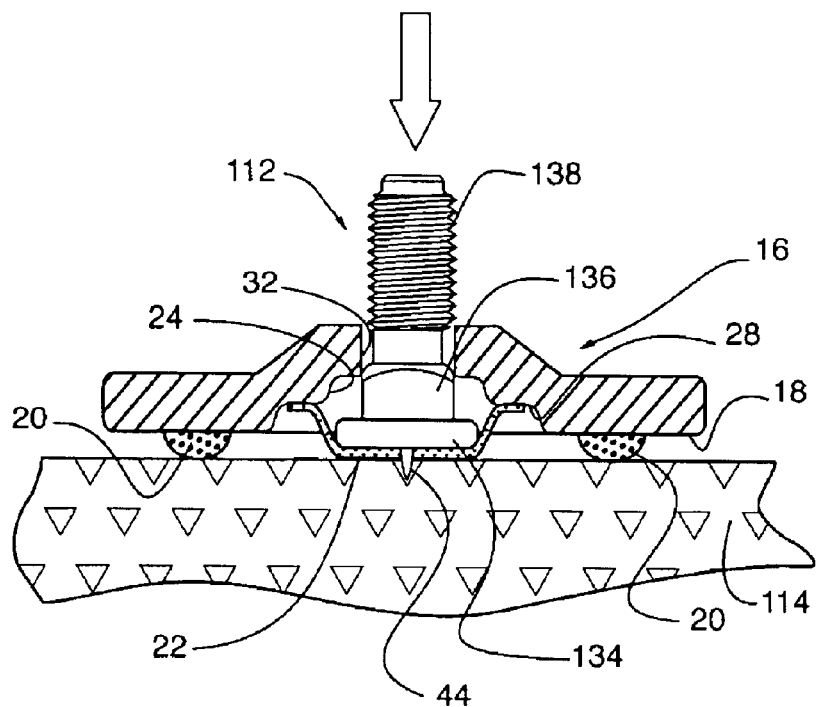
FIG. 15 is a fragmented sectional view similar to FIG. 14, but showing displacement of an attachment component into temporary securement with a substrate, for applying a positive force urging the base fixture against the substrate for the bonding agent cure time.
Figure 16:
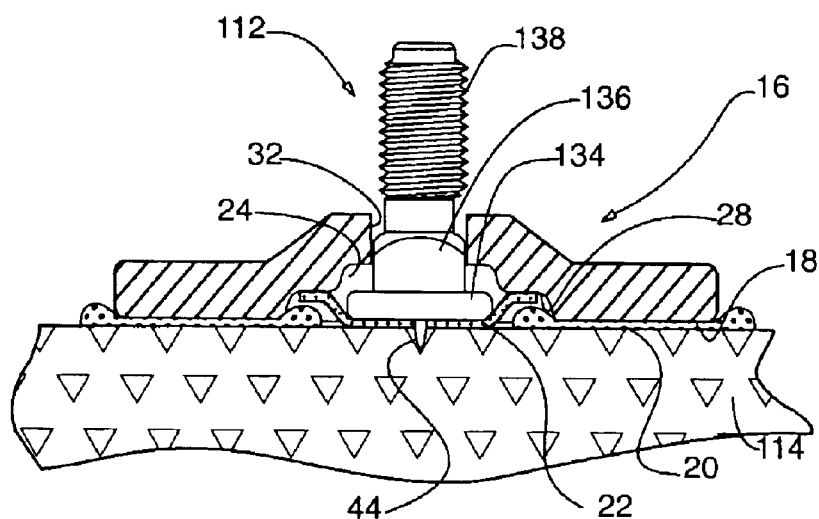
FIG. 16 is a fragmented sectional view similar to FIG. 15, and depicting the adhesive attachment in a position bonded to the substrate.

FIGS. 14–16 illustrate a further alternative preferred form of the invention, representing a modification of the embodiments of FIGS. 1–13, and wherein structure components corresponding with those shown and described in FIGS. 1–13 are identified by the same reference numerals. In this embodiment, the attachment component 112 shown in the form of a threaded bolt includes the temporary fastener element 44 in the form of the concrete nail or the like, as shown and described in FIGS. 8–13. The related spring element or means for applying a positive force urging the self fixturing adhesive attachment against a substrate 14 comprises a resilient pressure sensitive adhesive member 22 as shown and described in FIGS. 1–7.

More specifically, the embodiment of FIGS. 14–16 includes the base fixture 16 having a centrally dished disk construction to define the blind side cavity 24 and annular blind side base surface 18 for receiving a quantity of a selected adhesive bonding agent 20. The attachment component 112 is shown in the form of the threaded bolt having its bolt head 134 seated within the blind side cavity, a bolt shoulder 136 protruding through a central disk port 32 of mating noncircular shape, and an outwardly protruding threaded shank 138. The bolt head 134 carries the downwardly projecting temporary fastener element 44 shown in the form of a concrete nail or the like. This pointed nail 44 is embedded within a layer 22 of a resilient pressure sensitive adhesive material (as previously shown and described with respect to FIGS. 1–7) wherein a first or central portion of the layer 22 overlies a blind side of the bolt head 134, a second or peripheral portion is adhered to the base fixture 16 as by connection to a recessed shoulder 28 formed within the cavity 24, and a third intermediate portion of the layer 22 extends between these first and second portions.

FIG. 14 shows initial placement of the self fixturing attachment onto the substrate 14, with the pointed tip of the temporary fastener element 44 retracted at least slightly from the substrate surface. FIG. 15 shows advancement of the attachment component 112 relative to the base fixture 16, as by an impact blow applied to the end of the threaded bolt, to drive the nail 44 into at least temporary connection with the underlying substrate 14. Such displacement also moves the central or first portion of the adhesive layer 22 into pressure sensitive adherence with the substrate, while stretching the intermediate third portion of the resilient layer 22. This results in the stretched portion of the layer 22 applying a positive force to the base fixture 16 for urging the base fixture 16 in a direction toward the substrate 14, thereby to achieve a substantially optimized bond connection therewith.

Figure 17:
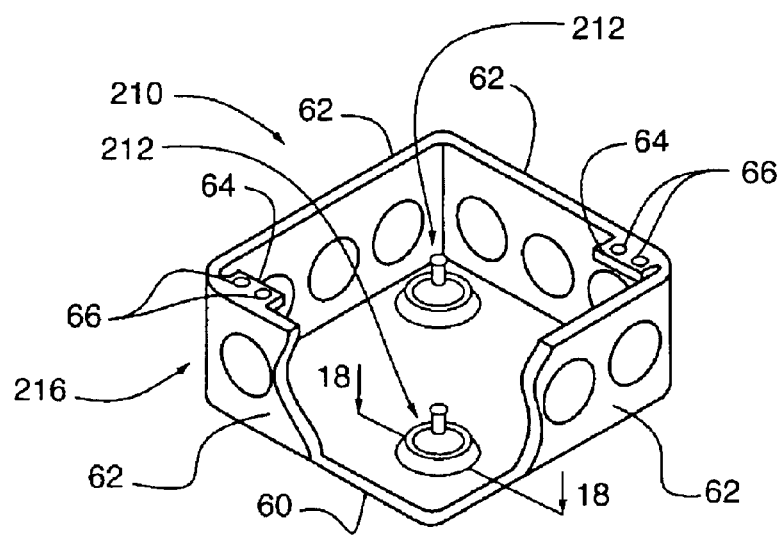
FIG. 17 is a fragmented perspective view illustrating still another alternative preferred form of a self fixturing adhesive attachment in accordance with the present invention.

A further alternative preferred form of the invention is illustrated in FIGS. 17–21, essentially comprising a functional reversal of the base fixture and attachment component elements shown and described in FIGS. 1–16. For ease and brevity of description, structural elements in FIGS. 17–21 which are analogous to those shown and described in FIGS. 1–7 are identified by common reference numerals increased by 200. FIG. 17 illustrates a modified self fixturing adhesive attachment 210 to include a base fixture 216 shown in the form of an electrical junction box adapted for secure adhesive mounting onto a substrate 214 (FIGS. 18–21), in combination with a pair of attachment components 212 shown in the form of a button which can be displaced relative to the box 216 for applying a positive force urging the box 216 against the substrate 214 for the cure time of a selected adhesive bonding agent 220. In this embodiment, the base fixture shown in the form of the junction box 216 comprises the structural element to be mounted onto the substrate.

More particularly, the electrical junction box 216 comprises an open-sided housing having a rear wall 60 joined at its perimeter to four forwardly extending top, bottom and side walls 62, an opposing pair of said walls 62 carrying inwardly bent tabs 64 (FIG. 17) along the front margins thereof having threaded apertures 66 therein for screw-mounting of an appropriately sized cover plate (not shown). The rear wall 60 of the box 216 defines a rear or blind side base surface 218 (FIGS. 18–21) of relatively flat configuration for adhesive mounting onto the surface of the substrate 214, as will be described. This rear wall 60 has a pair of open ports 232 formed therein, shown at diagonally opposed positions, wherein each port 232 is formed centrally within a forwardly dished region 68 of the rear wall 60 defining a rearwardly open cavity 224.

The counterpart attachment component 212 includes a movable button 58 mounted within each rear wall port 232. As shown, each button 58 comprises a cylindrical body having an upper end protruding through the associated port 232, and a lower end engaging first or central region of a resilient pressure sensitive adhesive layer 222 within the associated dished cavity 224. A lower end of the button 58 may be radially outwardly flanged, as shown, to provide an extended surface area engaging the adhesive layer 222. A second or peripheral annular portion of the adhesive layer 222 is adhered to the underside of the dished region 68 of the rear wall 60, within the cavity 224, leaving a third or intermediate portion of the adhesive layer extending between the first and second portions.

Figure 18:
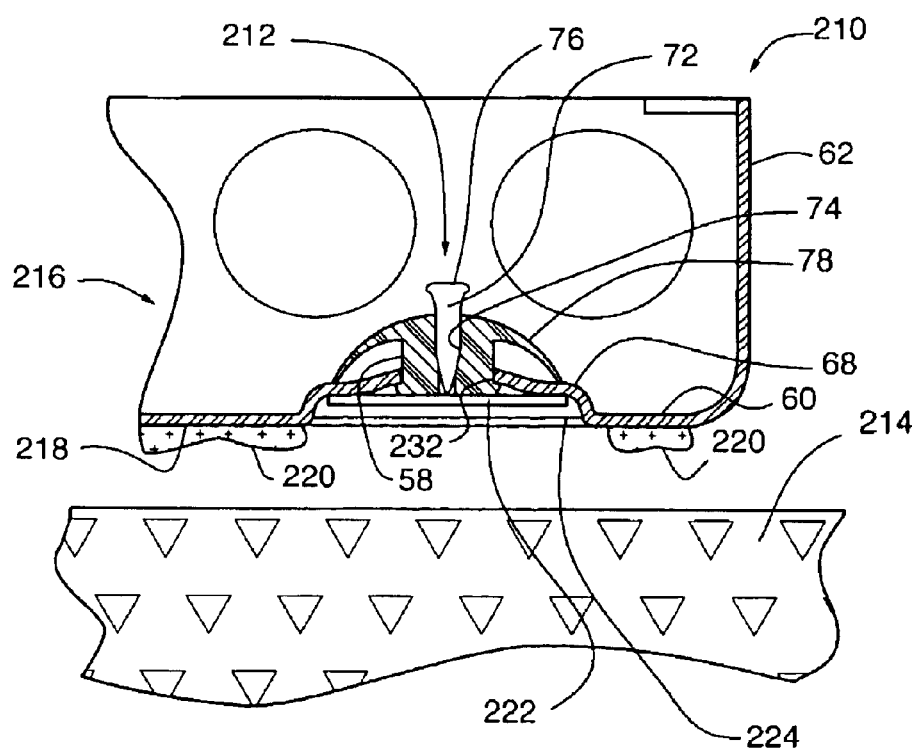
FIG. 18 is an enlarged fragmented sectional view taken generally on the line 18—18 of FIG. 17.

The attachment component 212 may also include a temporary fastener element such as a concrete nail 72 fitted through a central bore 74 formed in the cylindrical button 58. FIG. 18 shows this nail 72 with a pointed lower end exposed beneath the button 58 within the cavity 224, and an enlarged head 76 located above the upper end of the button. A spring element 78 such as a flexible flange on the button 58 is interposed between the upper end of the button 58 and the nail head 76.

Figure 19:
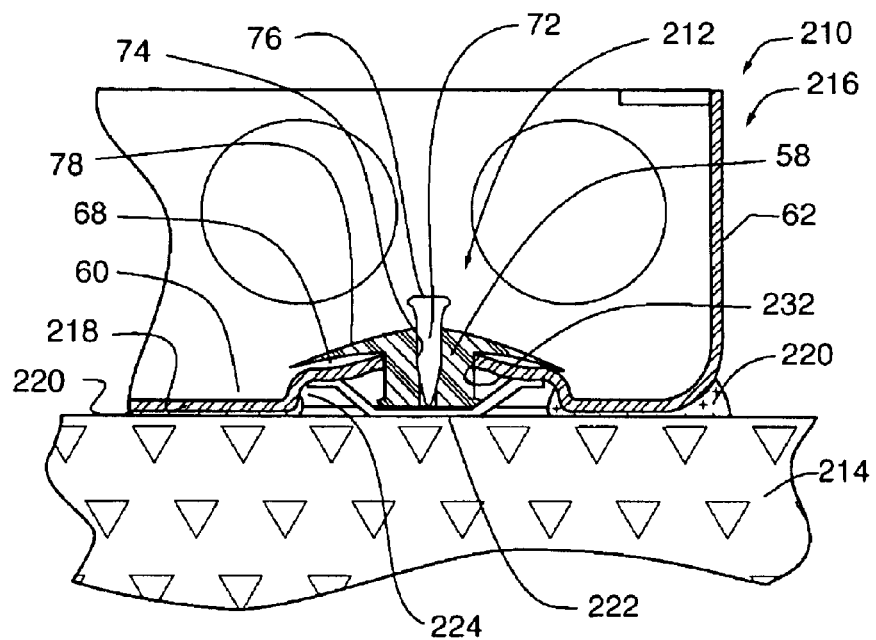
FIG. 19 is a fragmented sectional view similar to FIG. 18, and showing displacement of an attachment component into temporary connection with a substrate, for applying a positive force urging a base fixture shown in the form of an electrical junction box against the substrate for a bonding agent cure time.

The self fixturing attachment 210 is mounted onto a substrate 214 by initially applying the selected adhesive bonding agent 220 to the blind side surface 218 of the junction box 216, and then firmly pressing the box 216 against the selected substrate surface (as viewed in FIGS. 18–19). The buttons 58 mounted within the rear wall ports 232 at opposite corners of the box 216 are then depressed or displaced rearwardly relative to the rear wall 60, for purposes of advancing the first or central region of the associated pressure sensitive adhesive layers 222 into firm adherence with the substrate 214. As previously shown and described with respect to FIGS. 1–7, the second or peripheral portion of the associated adhesive layers 222 remain in adherence with the inset dished regions 68 of the rear wall 60, resulting in stretched elongation of the intermediate third portions to apply a positive force urging the rear wall 60 of the junction box 216 against the substrate 214 for the duration of the bonding agent cure time. Once again, such positive force applied to the box 216 causes the bonding agent 220 to extrude between the blind side surface 218 and the substrate 214 into a relatively thin bond layer of precision uniform thickness (FIG. 21) to achieve a substantially optimized bond strength therebetween.

Figure 20:
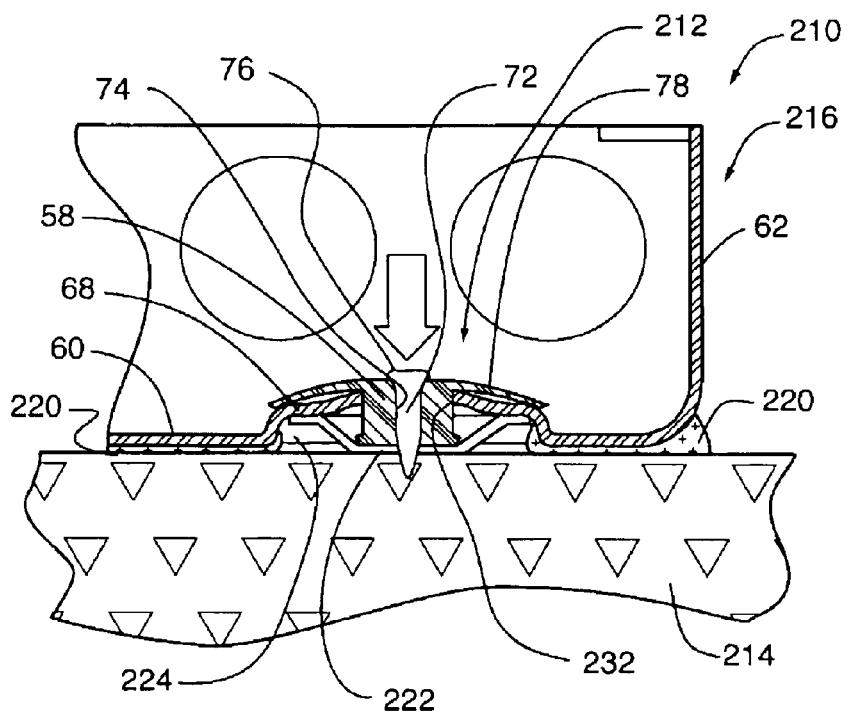
FIG. 20 is a fragmented sectional view similar to FIG. 19, and depicting further or alternative connection of the attachment component to the substrate.
Figure 21:
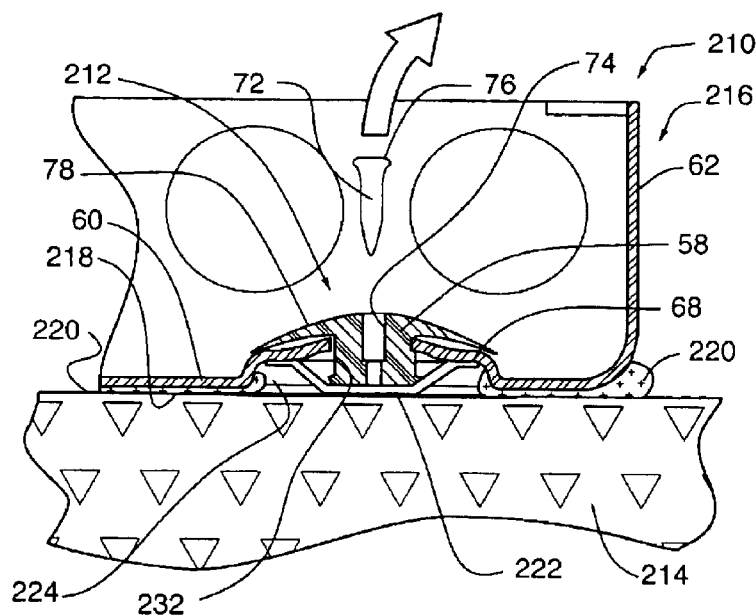
FIG. 21 is a fragmented sectional view similar to FIG. 20 showing the adhesive attachment bonded to the substrate.

For additional or alternative application of positive forces urging the rear wall 60 against the substrate 214, each nail 72 can be advanced within the associated button 58 for embedding the pointed tip into the substrate surface. Such advancement of the nail 72, as by applying a suitable impact to the nail head 76 as viewed in FIG. 20, is accompanied by deformation of the associated spring element 78 which then reacts between the nail head 76 and the dished region 68 of the rear wall 60 for urging the box 216 with a positive force against the substrate 214. In the event that nail usage is not required, the nail 72 may be separated from the button 58, as shown in FIG. 21.

FIGS. 22–25 show a further alternative preferred embodiment of the invention, comprising a variation of the configuration depicted in FIGS. 18–21, and wherein functional counterpart components are identified by 300 series reference numerals. In this version of the invention, an electrical junction box 316 includes a rear wall 360 having one or more knock-out plug holes 80 formed therein. One or more snap ring assemblies 82 of molded plastic or the like is provided for snap-fit mounting into the rear wall holes 80 formed upon removal of selected knock-out plugs (not shown). Each snap ring assembly 82 comprises a dual function movable button and spring element actuatable for positively urging the rear wall 360 of the box 316 against a substrate 314 for the cure time duration of a selected adhesive bonding agent 320.

Figure 22:
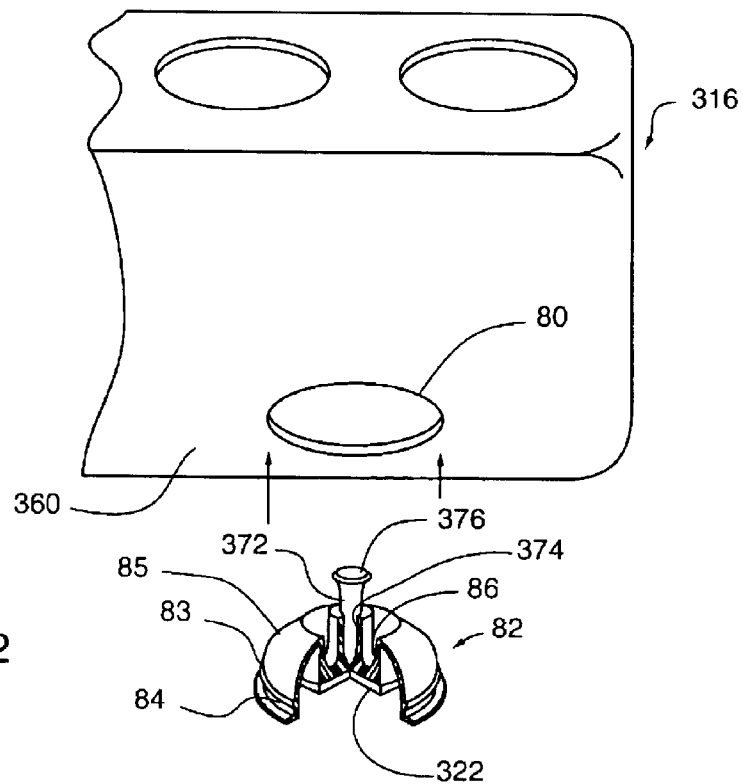
FIG. 22 is an enlarged and fragmented exploded perspective view similar to FIG. 18, but illustrating a further alternative preferred form of the invention.

FIG. 22 shows a knock-out plug hole 80 within the rear wall 360 of the junction box 316. The snap ring assembly 82 has an outer ring segment 83 with a size and shape for snap-fit mounting into said hole 80, preferably with the marginal hole edge seated within a radially outwardly open annular snap ring groove 84. From the outer ring segment 83, the snap ring assembly 82 incorporates a relatively thin and somewhat pliable intermediate annular segment 85 extending radially inwardly and upwardly, and then turning downwardly to join with a central disk or button 86. An underside or blind side surface of the button 86 carries a layer 322 of a resilient pressure sensitive adhesive material. A central bore 374 may also be formed in the central button 86 for receiving a concrete nail 372 or the like having a pointed tip and an enlarged head 376.

Figure 23:
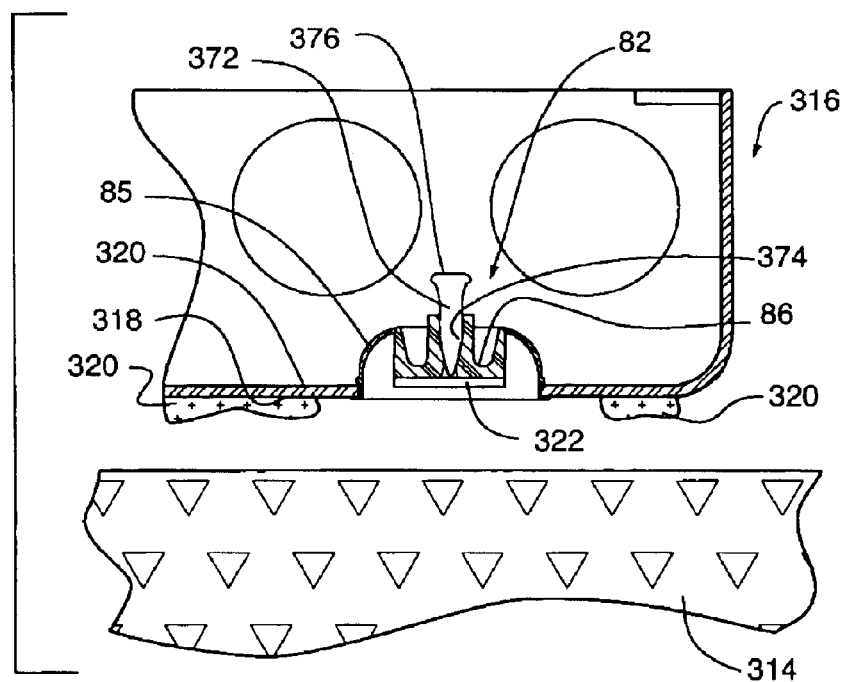
FIG. 23 is a fragmented sectional view similar to FIG. 19, depicting the embodiment of FIG. 22.
Figure 24:
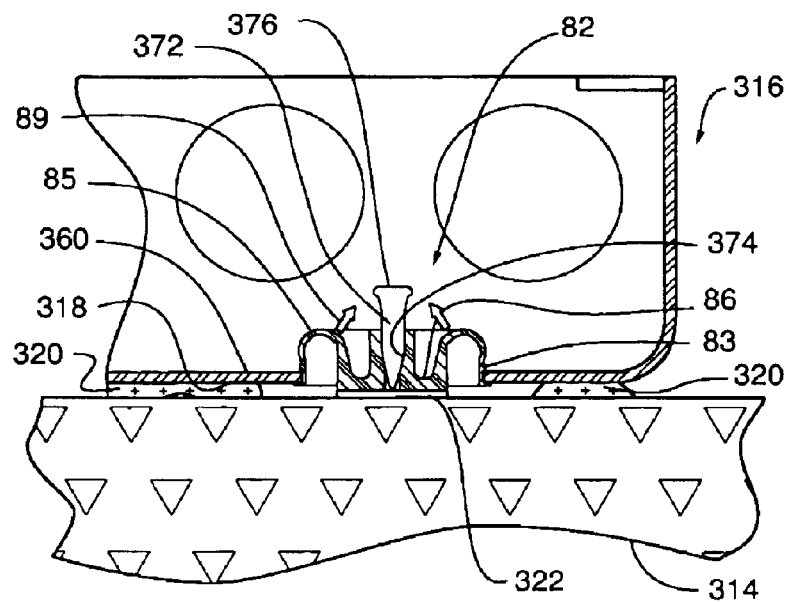
FIG. 24 is a fragmented sectional view similar to FIG. 23, showing displacement of an attachment component into temporary connection with a substrate, for applying a positive force urging a base fixture shown in the form of an electrical junction box against the substrate for a bonding agent cure time.
Figure 25:
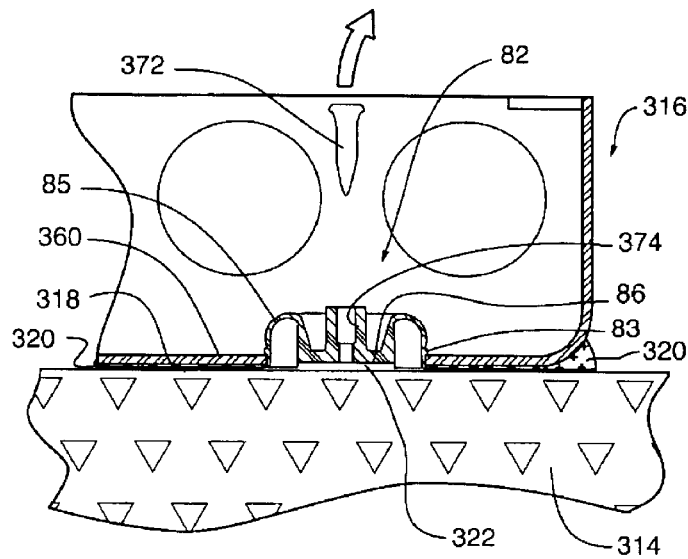
FIG. 25 is a fragmented sectional view similar to FIG. 24 showing the adhesive attachment bonded to the substrate.

The selected adhesive bonding agent 320 is applied to a rear or blind side surface 318 of the junction box rear wall 360, whereupon the junction box 316 is pressed firmly against the selected substrate 314, as viewed in FIG. 23. The central button 86 of each snap ring assembly 82 is then pressed and displaced relative to the rear wall 360 in a direction toward the substrate 314 to firmly adhere the adhesive layer 322 to the substrate (FIG. 24). Such displacement of the button 86 rolls the pliable intermediate segment 85 of the snap ring assembly 82 toward the substrate whereby this intermediate segment 85 applies a reaction force tending to pull back away from the substrate as indicated by arrows 89 in FIG. 24. Such pulling force is resisted by the resilient adhesive layer 322 which is thus placed under tension. These reaction forces are transmitted through the snap ring structures to the rear wall 360 of the box 316, to result in a positive force urging the rear wall 360 in a direction toward the substrate. Thus, positive pressure is applied to the bonding agent 320 to extrude that material to a relatively thin and uniform bondline which cures with substantially optimized bond strength (FIG. 25).

In the event that additional or alternative temporary securement of the central button 86 to the substrate 314 is desired or required, such as in the case of a concrete substrate which is somewhat dirty or dusty to preclude adequate adhesion of the layer 322, the nail 372 can be advanced and embedded within the substrate 314 in the manner shown and described with respect to FIGS. 18–21. In this case, advancement of the nail 372 is accompanied by similar rollover displacement of the intermediate segment 85 of the snap ring, resulting in a reaction force which urges the box 316 in a direction toward the substrate for the duration of the bonding agent cure time.

FIGS. 26–29 show another alternative preferred form of the invention, wherein a simplified adhesive attachment referred to generally by the reference numeral 410 is provided for mounting a base fixture 416 (FIG. 27–29) such as an electrical junction box or other selected structure onto a substrate 414, such as a vertical wall surface. The adhesive attachment 410 is designed for assembly with the junction box 416 at the front or accessible side of an opening or port 432 formed therein, such as a port 432 formed upon removal of a knock-out plug (not shown) formed in a rear wall 460 thereof. Multiple attachment assemblies 410 may be used to mount a single junction box or the like, if desired.

Figure 26:
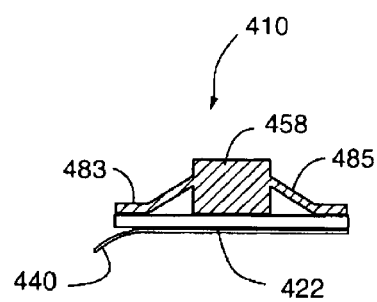
FIG. 26 is a sectional view depicting another alternative preferred form of a self fixturing adhesive attachment in accordance with the invention.
Figure 27:
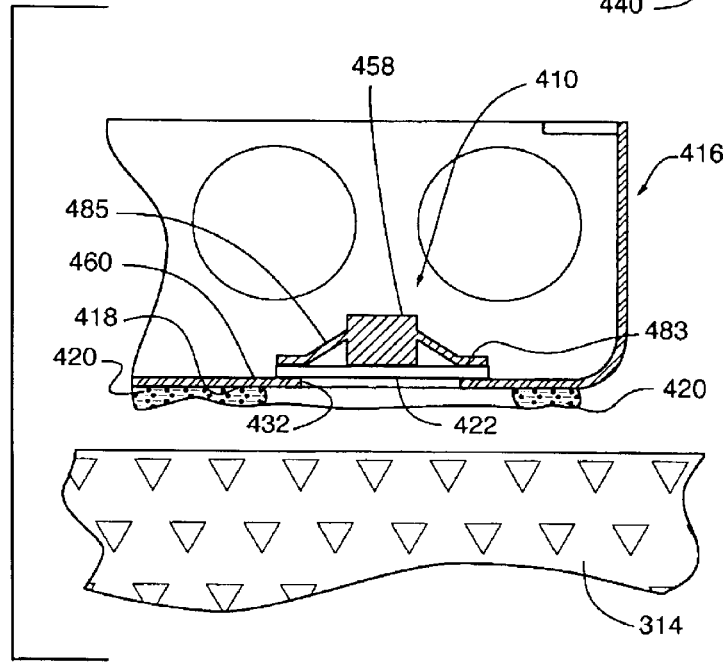
FIG. 27 is a fragmented sectional view showing the adhesive attachment of FIG. 26 for use in mounting an electrical junction box or the like onto a substrate.
Figure 28:
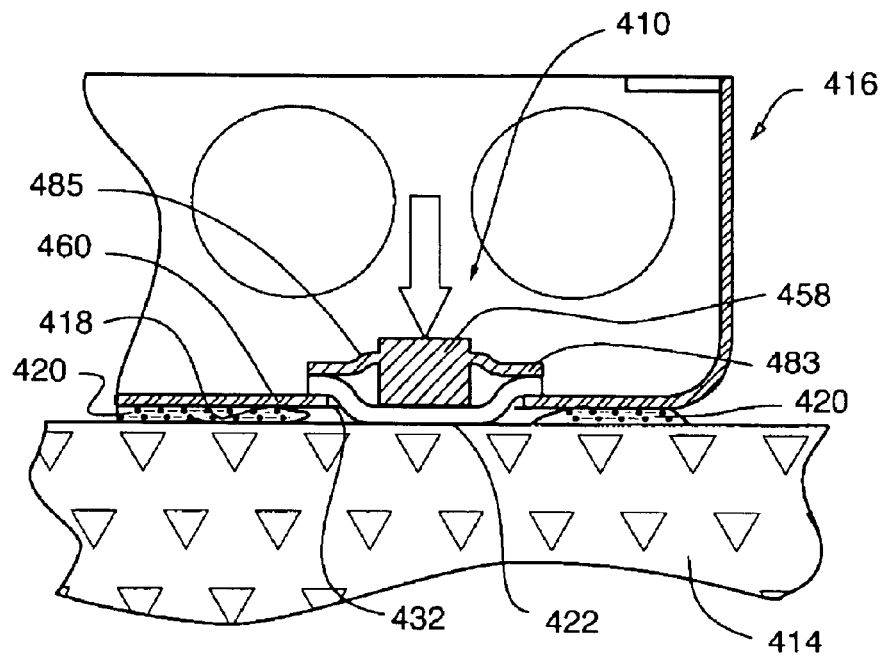
FIG. 28 is a fragmented sectional view similar to FIG. 27, depicting displacement of a portion of the adhesive attachment into engagement with the substrate.
Figure 29:
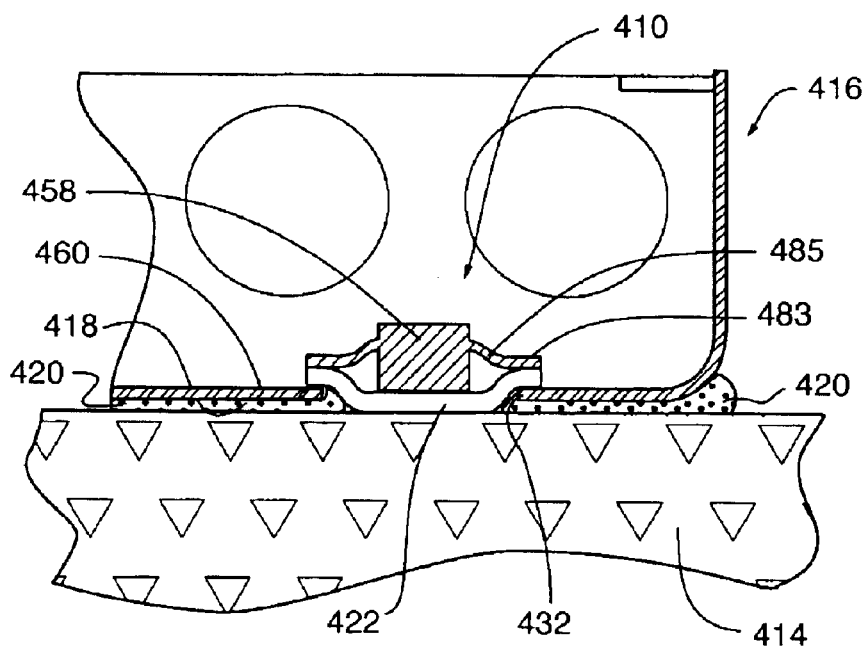
FIG. 29 is a fragmented sectional view similar to FIG. 28, showing the electrical junction box or the like bonded to the substrate.

The adhesive attachment 410 comprises a central hub or button 458 joined to an outwardly radiating annular segment 485 which is relatively thin and pliable, and which is in turn joined to an outer annular ring segment 483. The underside of this outer ring segment 483 is adhered to the periphery of a pressure sensitive adhesive layer 422 such as a layer of the VHB Type 4910 Tape (3M) shown and described previously herein. The underside of this adhesive layer 422 may be normally covered and protected by a suitable paper peel-off strip 440 (FIG. 26). In use, the peel-off strip 440 is removed, and the underside periphery of the adhesive layer 422 is press-adhered onto the rear wall 460 of the junction box 416 to overlie and cover one of the ports 432 formed therein (FIG. 27). A selected adhesive bonding agent 420 is applied to a rear or blind side surface 418 of the junction box 416 (FIG. 27), and the structure is then press mounted onto the substrate 414 at the selected mounting location. The central button 458 of the adhesive attachment 410 is pressed toward the substrate 414, as viewed in FIG. 28, for pressing a first or central segment of the adhesive layer 422 through the port 432 into firm adherence with the substrate. In the manner previously shown and described herein with respect to FIGS. 1–7, a second or peripheral segment of the adhesive layer 422 remains adhered to the attachment outer ring segment 483 at a front side of the box rear wall 460, with a third or intermediate annular segment stretch-elongated therebetween to apply a positive force urging the rear wall 460 of the junction box 416 against the substrate 414. This positive force causes the bonding agent 420 to extrude between the box rear surface 418 and the substrate 414 to provide a thin and high strength cured bond layer attachment (FIG. 29).

A nail (not shown) may be carried within by the button 458 and can be advanced and embedded within the substrate 414 in the manner shown and described with respect to FIGS. 18–21, or removed if not needed.

FIGS. 30–33 illustrate a modified version of the adhesive attachment shown in FIGS. 26–29, for securing a base fixture 516 such as an electrical junction box to the surface of a substrate 514. The modified adhesive attachment 510 of FIGS. 30–33 includes an alternative means for temporarily securing the junction box 516 to the substrate, in combination with a spring element for urging the box positively against the substrate for the cure time of a selected adhesive bonding agent 520.

Figure 30:
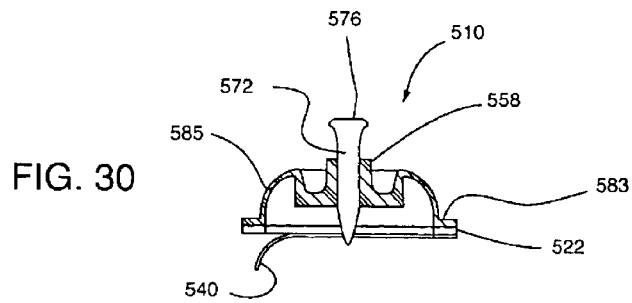
FIG. 30 is a sectional view depicting still another alternative preferred form of a self fixturing adhesive attachment in accordance with the present invention.
Figure 31:
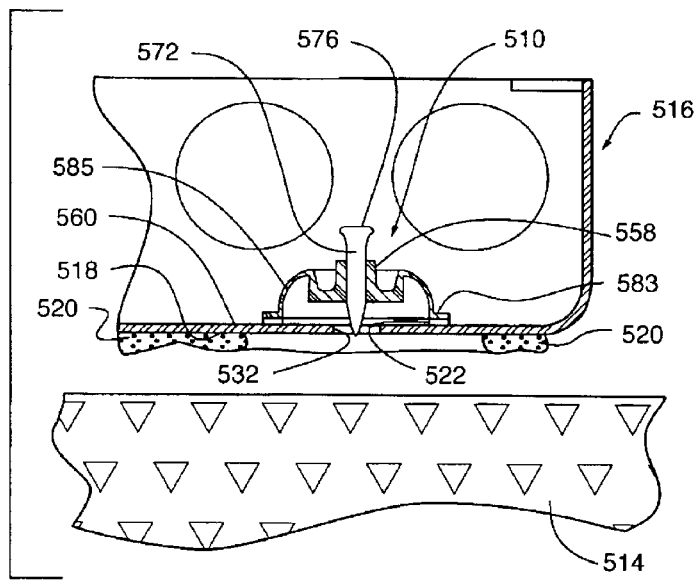
FIG. 31 is a fragmented sectional view showing the adhesive attachment of FIG. 30 for use in mounting an electrical junction box or the like onto a substrate.
Figure 32:
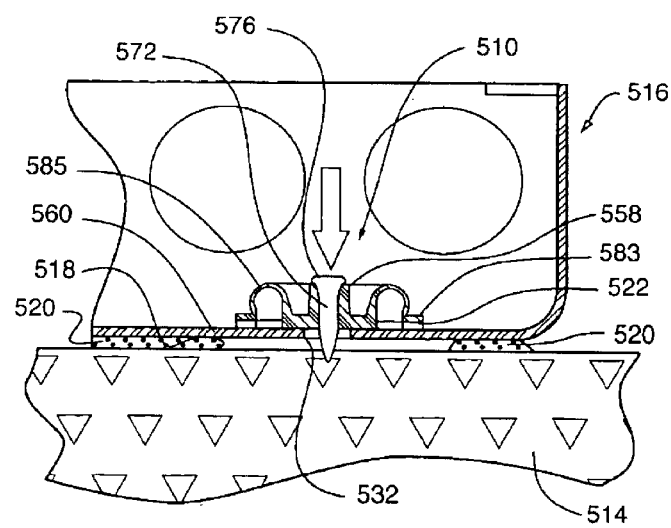
FIG. 32 is a fragmented sectional view similar to FIG. 31, depicting displacement of a portion of the adhesive attachment into engagement with the substrate.

The adhesive attachment 510 again comprises a central hub or button 558 joined to an outwardly radiating annular segment 585 which is designed and shaped to provide the desired spring element, as will be described in more detail. This annular spring segment 585 is in turn joined to an outer annular ring segment 583. The annular underside of this outer ring segment 583 carries a suitable pressure adhesive layer 522, the underside of which may be normally covered and protected by a suitable paper peel-off strip 540 (FIG. 30). In use, the peel-off strip 540 is removed, and the underside periphery of the adhesive layer 522 is press-adhered onto the rear wall 560 of the junction box 516 to overlie and cover one of the rear wall ports 532 formed therein (FIG. 31), all in the same general manner as shown and described in FIGS. 26–29. The selected adhesive bonding agent 520 is applied to a rear or blind side surface 518 of the junction box 516 (FIG. 31), and the structure is then press mounted onto the substrate 514 at the selected mounting location.

Figure 33:
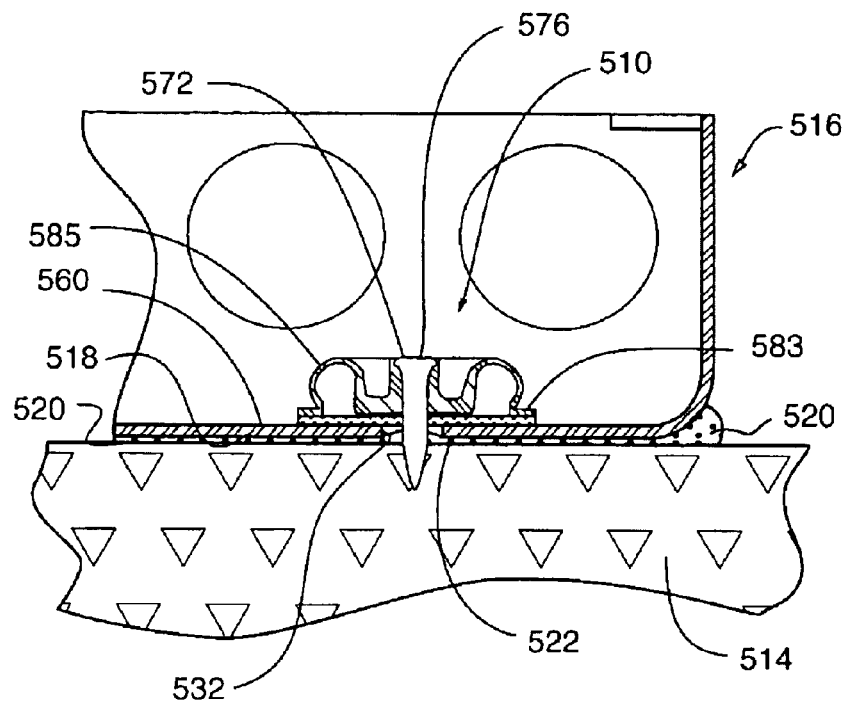
FIG. 33 is a fragmented sectional view similar to FIG. 32, showing the electrical junction box or the like bonded to the substrate.

In accordance with this embodiment, the central button 558 of the adhesive attachment 510 carries a downwardly protruding fastener element such as a pointed tip concrete nail 572. As previously shown and described herein with respect to FIGS. 8–13 and 17–25, a head 576 of the concrete nail 572 is impacted for driving the pointed nail tip into the surface of the substrate 514, as viewed in FIG. 32, for at least temporary connection thereto. Such advancement of the nail 572 relative to the junction box 516 causes the annular spring segment 585 to roll upon itself in a manner to apply a spring force positively urging the box 516 against the substrate 514 for the cure time of the bonding agent 520. Once again, this positive force applied to the junction box 516 causes the bonding agent 520 to extrude between the box rear surface 518 and the substrate 514 to provide a thin and high strength cured bond layer attachment (FIG. 33).

Figure 34:
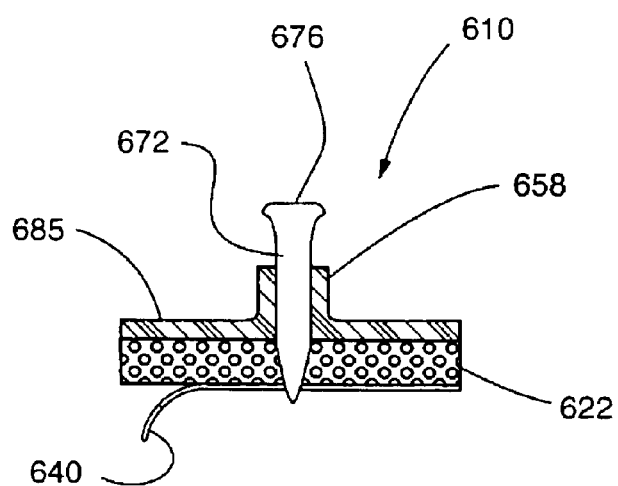
FIG. 34 is a sectional view depicting a further alternative preferred form of a self fixturing adhesive attachment in accordance with the present invention.
Figure 35:
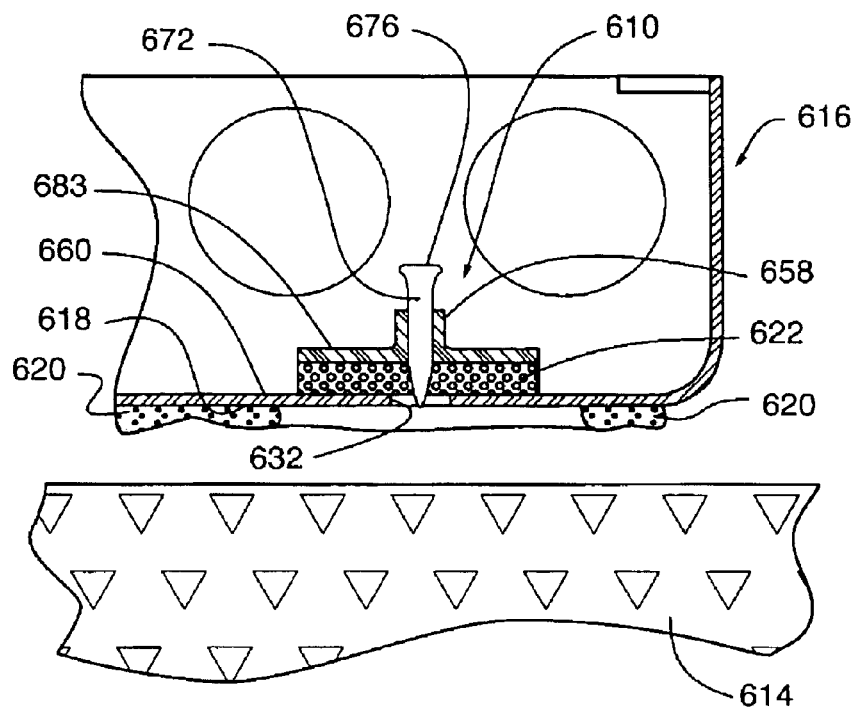
FIG. 35 is a fragmented sectional view showing the adhesive attachment of FIG. 34 for use in mounting an electrical junction box or the like onto a substrate.
Figure 36:
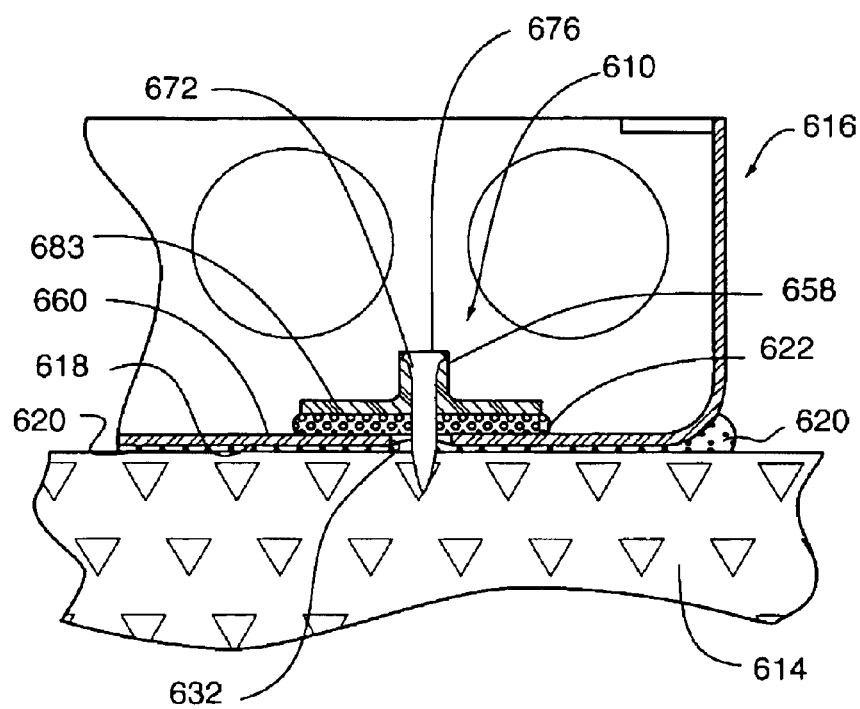
FIG. 36 is a fragmented sectional view similar to FIG. 35, depicting displacement of a portion of the adhesive attachment into engagement with the substrate.

FIGS. 34–36 show yet another alternative preferred form of the invention, wherein a further modified adhesive attachment 610 has a simplified spring means for applying a positive force urging a base fixture 616 such as an electrical junction box against a substrate 614 for the cure time of a selected adhesive bonding agent 620.

The modified adhesive attachment 610 comprises a central hub or button 658 joined to an outwardly radiating annular flange 683 which can be formed from a suitable, relatively rigid material such as metal or plastic. The underside of this button/flange structure 658, 683 carries a compressible layer 622 of a resilient foam material which is adhered thereto by a pressure sensitive adhesive. This resilient layer 622 also carries a pressure sensitive adhesive on the underside thereof, whereat a peel-off strip 640 (FIG. 34) is provided for normally protecting the adhesive from contact with dust and dirt and other contaminants.

At the time of use, the peel-off strip 640 is removed, and the underside periphery of the resilient layer 622 is press-adhered onto the rear wall 660 of the junction box 616 to overlie and cover one of the ports 632 formed therein (FIG. 35). A selected adhesive bonding agent 620 is applied to a rear or blind side surface 618 of the junction box 616 (FIG. 35), and the structure is then press mounted onto the substrate 614 at the selected mounting location. The central button 658 of the adhesive attachment 610 again carries a downwardly protruding fastener element such as a pointed tip concrete nail 672. As previously shown and described herein with respect to FIGS. 8–13 and 17–25, a head 676 of the concrete nail 672 is impacted for driving the pointed nail tip into the surface of the substrate 614, as viewed in FIG. 36, for at least temporary connection thereto. Such advancement of the nail 672 relative to the junction box 616 compresses the resilient layer 622 for applying a reaction spring force between the underside of the annular segment 683 and the rear wall 660 of the junction box 616, for positively urging the box 616 against the substrate 614 for the cure time of the bonding agent 620. In the same manner as previously described with respect to FIGS. 30–33, this positive force applied to the junction box 616 causes the bonding agent 620 to extrude between the box rear surface 618 and the substrate 614 to provide a thin and high strength cured bond layer attachment.

A variety of further modifications and improvements in and to the self fixturing adhesive attachments of the present invention will be apparent to those persons skilled in the art. For example, while the invention has been shown and described with respect to several specific types of attachment structures, person skilled in the art will recognize and appreciate that a wide variety of alternative attachment structures and devices may be employed. Accordingly, no limitation on the invention is intended byway of the foregoing description and accompanying drawings, except as set forth in the appended claims.

What is claimed is:

1. A self fixturing adhesive attachment, comprising:
    a base fixture defining a base surface for receiving a curable bonding agent for bonded attachment of said base fixture to a substrate;
    an attachment component carried by said base fixture for movement between an initial first position retracted at least slightly from the substrate, when said base surface is seated against the substrate, and a subsequent second position advanced toward the substrate; and
    springable attachment means for at least temporarily securing said attachment component to the substrate and for urging said base surface of said base fixture with a positive force against the substrate, upon movement of said attachment component from said first position to said second position while said base surface is seated against the substrate, for at least the duration of a cure time for a bonding agent interposed between said base surface and the substrate;
    said springable attachment means comprising a pressure sensitive adhesive member having a first portion carried by said attachment component for at least temporarily securing said attachment component to the substrate, a second portion carried by said base fixture, and a third portion extending between said first and second portions for stretched elongation when said base surface is seated against the substrate with said attachment component in said second position to draw said base fixture against the substrate.

2. The self fixturing adhesive attachment of claim 1 further including a curable bonding agent on said base surface of said base fixture.

3. The self fixturing adhesive attachment of claim 1 wherein said base surface of said base fixture generally circumscribes said attachment component.

4. The self fixturing adhesive attachment of claim 3 wherein said base surface has a generally annular shape.

5. The self fixturing adhesive attachment of claim 1 wherein said attachment component comprises a threaded bolt having a bolt head and an elongated threaded shank, said base fixture defining a recessed cavity formed in a blind side thereof for receiving said bolt head, said bolt shank protruding through a port formed in said base fixture for exposure and access at a front side of said base fixture.

6. The self fixturing adhesive attachment of claim 5 wherein said bolt further includes a bolt shoulder of noncircular cross section interposed between said bolt head and shank, and further wherein said port has a matingly shaped noncircular cross section for receiving said bolt shoulder.

7. The self fixturing adhesive attachment of claim 1 wherein said attachment component comprises a button movably carried by said base fixture for movement between said first and second positions.

8. The self fixturing adhesive attachment of claim 7 wherein said base fixture comprises a junction box.

9. The self fixturing adhesive attachment of claim 1 wherein said springable attachment means further includes a nail for at least temporarily securing said attachment component to the substrate.

10. A self fixturing adhesive attachment, comprising:
a base fixture defining a base surface for receiving a curable bonding agent for bonded attachment of said base fixture to a substrate;
an attachment component carried by said base fixture for movement between an initial first position retracted at least slightly from the substrate, when said base surface is seated against the substrate, and a subsequent second position advanced toward the substrate; and
springable attachment means for at leapt temporarily securing said attachment component to the substrate and for urging said base surface of said base fixture with a positive force against the substrate, upon movement of said attachment component from said first position to said second position while said base surface is seated against the substrate, for at least the duration of a cure time for a bonding agent interposed between paid base surface and the substrate;
said springable attachment means comprising a nail for at least temporarily securing said attachment component to the substrate, and a spring reacting between said attachment component and said base fixture for urging said base fixture against the substrate, when said base surface is seated against the substrate with said attachment component in said second position.

11. The self fixturing adhesive attachment of claim 10 wherein said attachment component comprises a threaded bolt having a bolt head with said nail thereon and an elongated threaded shank, said base fixture defining a recessed cavity formed in a blind side thereof for receiving said bolt head, said bolt shank protruding through a port formed in said base fixture for exposure and access at a front side of said base fixture, and said spring reacting between said bolt shank and said base fixture for urging said base fixture against the substrate.

12. The self fixturing adhesive attachment of claim 11 wherein said bolt further includes a bolt shoulder of noncircular cross section interposed between said bolt head and shank, and further wherein said port has a matingly shaped noncircular cross section for receiving said bolt shoulder.

13. The self fixturing adhesive attachment of claim 10 wherein said attachment component comprises a button movably carried by said base fixture for movement between said first and second positions.

14. The self fixturing adhesive attachment of claim 13 wherein said base fixture comprises a junction box.

15. The self fixturing adhesive attachment of claim 10 wherein said springable attachment means further comprises a pressure sensitive adhesive member for at least temporarily securing said attachment component to the substrate.

16. The self fixturing adhesive attachment of claim 1 wherein said attachment component comprises a snap ring assembly carried by said base fixture, said snap ring assembly including a central button movable relative to said base fixture between said first and second positions.

17. A self fixturing adhesive attachment, comprising:
a base fixture defining a base surface for receiving a curable bonding agent for bonded attachment of said base fixture to a substrate;
an attachment component carried by said base fixture for movement between first and second positions respectively retracted at least slightly from and advanced toward the substrate, when said base surface is seated against the substrate; and
springable attachment means for at least temporarily securing said attachment component to the substrate and for urging said base surface of said base fixture with a positive force against the substrate, when said base surface is seated against the substrate with said attachment component in said second position, for at least the duration of a cure time for a bonding agent interposed between said base surface and the substrate;
said springable attachment means comprising a pressure sensitive adhesive member having a first portion carried by said attachment component for at least temporarily securing said attachment component to the substrate, a second portion carried by said base fixture, and a third portion extending between said first and second portions for stretched elongation when said base surface is seated against the substrate with said attachment component in said second position to draw said base fixture against the substrate.

18. The self fixturing adhesive attachment of claim 17 further including a curable bonding agent on said base surface of said base fixture.

19. The self fixturing adhesive attachment of claim 17 wherein said base surface of said base fixture generally circumscribes said attachment component.

20. The self fixturing adhesive attachment of claim 17 wherein said attachment component comprises a threaded bolt having a bolt head and an elongated threaded shank, said base fixture defining a recessed cavity formed in a blind side thereof for receiving said bolt head, said bolt shank protruding through a port formed in said base fixture for exposure and access at a front side of said base fixture.

21. The self fixturing adhesive attachment of claim 17 wherein said attachment component comprises a button movably carried by said base fixture for movement between said first and second positions.

22. The self fixturing adhesive attachment of claim 17 wherein said springable attachment means further includes a nail for at least temporarily securing said attachment component to the substrate.

23. The self fixturing adhesive attachment of claim 17 wherein said attachment component comprises a snap ring assembly carried by said base fixture, said snap ring assembly including a central button movable relative to said base fixture between said first and second positions.

24. A self fixturing adhesive attachment, comprising:
a base fixture defining a base surface for receiving a curable bonding agent for bonded attachment of said base fixture to a substrate;

an attachment component carried by said base fixture for movement between an initial first position retracted at least slightly from the substrate, when said base surface is seated against the substrate, and a subsequent second position advanced toward the substrate;

securing means comprising a nail for at least temporarily securing said attachment component to the substrate, upon movement of said attachment component from said first position to said second position while said base surface is seated against the substrate, for at least the duration of a cure time for a bonding agent interposed between said base surface and the substrate; and spring means for urging said base surface of said base fixture with a positive force against the substrate, when said base surface is seated against the substrate with said attachment component in said second position.

25. The self fixturing adhesive attachment of claim 24 further including a curable bonding agent on said base surface of said base fixture.

26. The self fixturing adhesive attachment of claim 24 wherein said base surface of said base fixture generally circumscribes said attachment component.

27. The self fixturing adhesive attachment of claim 24 wherein said attachment component comprises a threaded bolt having a bolt head with said nail thereon and an elongated threaded shank, said base fixture defining a recessed cavity formed in a blind side thereof for receiving said bolt head, said bolt shank protruding through a port formed in said base fixture for exposure and access at a front side of said base fixture, and said spring reacting between said bolt shank and said base fixture for urging said base fixture against the substrate.

28. The self fixturing adhesive attachment of claim 24 wherein said spring means comprises a spring reacting between said attachment component and said base fixture for urging said base fixture against the substrate, when said base surface is seated against the substrate with said attachment component in said second position.

29. The self fixturing adhesive attachment of claim 24 wherein said securing means further comprises a pressure sensitive adhesive member for at least temporarily securing said attachment component to the substrate.

30. The self fixturing adhesive attachment of claim 24 wherein said attachment component comprises a button movably carried by said base fixture for movement between said first and second positions.

31. The self fixturing adhesive attachment of claim 24 wherein said attachment component comprises a snap ring assembly carried by said base fixture, said snap ring assembly including a central button movable relative to said base fixture between said first and second positions.

32. A self fixturing adhesive attachment, comprising:
a base fixture defining a base surface for receiving a curable bonding agent for bonded attachment of said base fixture to a substrate;

an attachment component carried by said base fixture for movement between first and second positions respectively retracted at least slightly from and advanced toward the substrate, when said base surface is seated against the substrate; and springable attachment means for urging said base surface of said base fixture with a positive force against the substrate, when said base surface is seated against the substrate with said attachment component in said second position, for at least the duration of a cure time for a bonding agent interposed between said base surface and the substrate;

said springable attachment means comprising a pressure sensitive adhesive member having a first portion for at least temporary securement to the substrate when said base surface is seated against the substrate with said attachment component in said second position, a second portion carried by said base fixture, and a third portion extending between said first and second portions for stretched elongation when said base surface is seated against the substrate with said attachment component in said second position to draw said base fixture against the substrate.

33. The self fixturing adhesive attachment of claim 32 further including a curable bonding agent on said base surface of said base fixture.

34. The self fixturing adhesive attachment of claim 32 wherein said base surface of said base fixture generally circumscribes said attachment component.

35. The self fixturing adhesive attachment of claim 32 wherein said attachment component comprises a threaded bolt having a bolt head and an elongated threaded shank, said base fixture defining a recessed cavity formed in a blind side thereof for receiving said bolt head, said bolt shank protruding through a port formed in said base fixture for exposure and access at a front side of said base fixture.

36. The self fixturing adhesive attachment of claim 32 wherein said attachment component comprises a button movably carried by said base fixture for movement between said first and second positions.

37. The self fixturing adhesive attachment of claim 32 wherein said springable attachment means further includes a nail for at least temporarily securing said attachment component to the substrate.

38. The self fixturing adhesive attachment of claim 32 wherein said attachment component comprises a snap ring assembly carried by said base fixture, said snap ring assembly including a central button movable relative to said base fixture between said first and second positions.

* * * * *